United States Patent [19]

Condon

[11] 3,870,676

[45] Mar. 11, 1975

[54] STABILIZED BLOCK COPOLYMER COMPOSITIONS

[75] Inventor: Nancy J. Condon, Long Beach, Calif.

[73] Assignee: Shell Oil Company, Houston, Tex.

[22] Filed: Apr. 23, 1973

[21] Appl. No.: 353,866

[52] U.S. Cl................. 260/33.6 AQ, 260/304. A, 260/33.6 EP, 260/37 EP, 260/42.47, 260/45.8 A, 260/836, 260/837 R, 260/880 B

[51] Int. Cl.... C08c 11/22, C08g 45/04, C08f 45/58

[58] Field of Search... 260/33.6 EP, 33.6 AQ, 837 R, 260/880 B, 836, 45.8 A, 30.4 A

[56] References Cited

UNITED STATES PATENTS

| | | | |
|---|---|---|---|
| 3,027,337 | 2/1962 | Tritsch | 260/33.6 R |
| 3,370,104 | 2/1968 | O'Brien et al. | 260/837 R |
| 3,464,850 | 9/1969 | Haefele | 260/33.6 AQ |

Primary Examiner—Donald E. Czaja
Assistant Examiner—H. H. Fletcher

[57] ABSTRACT

Compositions are provided comprising a major proportion of block copolymers of alkenyl arenes and conjugated dienes as well as their hydrogenation products stabilized with a minor amount of a hydroxyl-containing polyepoxide.

5 Claims, No Drawings

3,870,676

STABILIZED BLOCK COPOLYMER COMPOSITIONS

BACKGROUND OF THE INVENTION

The present invention is concerned with a composition having improved resistance to discoloration and degradation and comprises certain block copolymers either with or without other components, as described more fully hereinafter, stabilized by the presence of a minor amount of certain polyepoxides, also fully described below.

The art of block copolymer synthesis and formulation is advancing rapidly at the present time. A number of technical problems have been encountered such as improving the processability of the block copolymers and improving their stability to degradation, resulting in loss in physical properties, discoloration, etc. Stability problems are encountered, of course, with many other polymers including polypropylene. This is especially evident, according to published literature, when polypropylene contains certain fillers such as talc which appears to adsorb antioxidants which have been added to the polypropylene compositions, thus depriving the polymer of the desired stabilizing concentration. It was found according to U.S. Pat. No. 3,553,158, that this situation could be alleviated by adding polyepoxides which apparently are preferentially adsorbed by the talc filler. This in turn leads to the antioxidants remaining in the polypropylene phase, thus permitting their full utilization in their intended role of stabilization of the polypropylene compositions. However, this utilization of polyepoxides in a filled polypropylene composition is markedly different from their use as stabilizers for block copolymers, particularly block copolymers which do not contain processing aids such as polypropylene or fillers such as talc.

Other compositions have been described in the literature which contain relatively major amounts of resins such as epoxy resins particularly in conjunction with oxidizing agents for the formation of rocket propellants and the like, as illustrated by French Pat. No. 1,574,769. An additional aspect of utilizing polyepoxides is shown in U.S. Pat. No. 3,135,716 wherein essentially trace amounts of certain polyepoxides are used as coupling agents for certain living block polymers.

OBJECT OF THE INVENTION

It is an object of the present invention to provide improved block copolymer compositions. It is a further object of the invention to provide block copolymer compositions showing improved stability. A more specific object of the invention comprises the provision of block copolymer compositions having improved color stability. Other objects will become apparent during the following detailed description of the invention.

STATEMENT OF THE INVENTION

Now, in accordance with the present invention, compositions are provided comprising a major proportion of a block copolymer having at least one monoalkenylarene polymer block and at least one conjugated diene polymer block as well as hydrogenated derivatives of these block copolymers; and a minor but stabilizing amount of a hydroxyl-containing polyepoxide having an epoxy equivalency greater than 1.0 and an epoxide equivalent weight of between about 200 and 6,000. The epoxide equivalent weight is defined as being the grams of resin containing one gram equivalent of epoxide groups. Again, in accordance with the present invention, the above basic composition may be modified by the addition of resins such as polystyrene and/or a polyolefin either with or without plasticizing oils, including oligomers, and by the addition of mineral fillers, all as more particularly described hereinafter.

The block copolymers of the present invention may be broadly divided into two general categories one of which comprises block polymerization products while the other of which comprises the same products which have been at least partially hydrogenated following polymerization. Two types of monomers are utilized in the formation of these block copolymers, one of which is a monoalkenylarene and the other of which is a conjugated diene. The monoalkenylarenes are typified by styrene, alphamethylstyrene, ring alkylated styrenes such as tertiary butylstyrene and mixtures of the same. The conjugated dienes are represented particularly by butadiene and isoprene as well as their mixtures. The block copolymers contemplated here have at least one block predominating in at least one monoalkenylarene and at least one other polymer block predominating in at least one conjugated diene. The block copolymers may be either linear or branched depending primarily upon details in their synthesis. The preparation of these block copolymers is the subject of a number of patents and technical papers. Lithium based initiators are preferred for this purpose. These may comprise monolithiumalkyls or a number of known di- or polylithiumalkyls. Lithium alkyls such as secondary butyllithium are specially preferred. Polymerization may be effected entirely in a sequential manner or sequential block polymerization may be followed by a coupling reaction, usually conducted on an intermediate block copolymer which is either still associated with a lithium ion ("living polymer") or an intermediate polymer bearing certain functional terminal groups such as carboxyls or hydroxyls and the like. Coupling agents are known in this art to include certain polyhaloalkanes or alkenes as well as polyfunctional coupling agents, preferably a silicon tetrahalide such as silicon tetrachloride. The present invention contemplates block copolymers within a wide range of average molecular weights. Preferably the monoalkenylarene polymer blocks have average molecular weights between about 5,000 and 150,000 while the conjugated diene polymer blocks have an average molecular weight between about 20,000 and 500,000. Still more preferably, the monoalkenylarene polymer blocks have average molecular weights in the order of 9,000 to 40,000 and the conjugated diene blocks have average molecular weights between about 40,000 and 150,000.

The hydrogenated counterparts of the above-described block copolymers may be used in place of or in addition to the nonhydrogenated precursors. Hydrogenation may be partial, complete, or random or selective. Hydrogenation is preferably selective in which at least 95% of the olefinic double bonds are saturated. Typical block copolymers coming within the scope of the above description include the following:

polystyrene-polybutadiene
polystyrene-polyisoprene-polystyrene
polyalphamethylstyrene-polybutadiene-polyalphamethylstyrene polystyrene-hydrogenated polybutadiene-polystyrene hydrogenated polystyrene-hydrogenated polyisoprene-hydrogenated polystyrene.

The polyepoxide materials used in preparing the compositions of the present invention comprise those organic materials which have more than one epoxy group, i.e., more than one

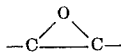

group, which group may be in a terminal position, i.e., a

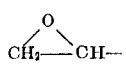

group, or in an internal position, i.e., a

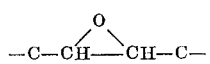

The polyepoxides may be saturated or unsaturated, aliphatic, cycloaliphatic, aromatic or heterocyclic and may be substituted with substituents, such as chlorine, hydroxyl or ether groups, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy) diphenyl ether, 1,8-bis(2,3-epoxypropoxy)octane, 1,4-bis(2,3-epoxypropoxy)cyclohexane, 4,4'-bis(2-hydroxy-3,4'-epoxybutoxy)diphenyl dimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy) benzene. Other examples include the epoxy polyethers of polyhydric phenols with a halogen-containing epoxide or dihalohydrin in the presence of an alkaline medium. Polyhydric phenols that can be used for this purpose include among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl) butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and halohydrin one obtains different molecular weight products as shown in U.S. Pat. No. 2,633,458.

A preferred group of the above-described epoxy polyethers of polyhydric phenols is glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50°C and 150°C. The heating is continued for several hours to effect the reaction and the product is then washed free of salt and base.

The preparation of suitable glycidyl polyethers of dihydric phenols is illustrated in U.S. Pat. No. 2,633,458.

Other types of epoxides useful in the compositions of this invention are the following:

1. Glycidyl polyethers of aliphatic $C_{2-10}$ polyhydric alcohols having 2-6 hydroxyl groups per molecule.
2. Epoxy esters of polybasic acids.
3. Epoxidized polycarboxylic acid esters of unsaturated alcohols having the ethylenic group in an internal position.

Polyepoxides having an epoxide equivalent weight of between 200 and 6,000 are preferred. Polyepoxides having an average molecular weight above 500, as for example, between about 800 and 3,100 are especially preferred. Very suitable polyepoxides are those formed from an epihalohydrin, and particularly epichlorohydrin, and a polyhydric compound, such as 2,2-bis(4-hydroxy-phenyl)propane or glycerol.

The polyepoxide which is used in the compositions of the present invention may be entirely a solid grade of resin or may be a blend of resins in which one of them is a liquid grade, such as, a polyepoxide having an epoxide equivalent weight of between about 225 and 290 and an average molecular weight of between 450 and 500. Thus, a suitable mixture of polyepoxides is a mixture containing between 60% and 80% by weight of a solid polyepoxide derived from an epihalohydrin and 2,2-bis(4-hydroxyphenyl)propane having an epoxide equivalent weight of between 1,650 and 2,050 and an average molecular weight of between 2,700 and 3,100 (see, for example, U.S. Pat. No. 2,633,458, column 6, line 74 to column 7, line 9) and between 20% and 40% by weight of a liquid polyepoxide derived from an epihalohydrin and diphenylol propane having an epoxide equivalent weight of between 175 and 210, and an average molecular weight of between 350 and 400.

The polyepoxide may also be a blend of solid resins, such as a blend of a resin having a melting point higher than 100°C, preferably in the 120°-160°C range, and a resin having a melting point below 80°C, preferably in the 60° to 80°C range, the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxide equivalent weight of between 1,650 and 2,050, and a melting point of between 120° and 160°C and between 50 and 70% by weight of a solid polyepoxide derived from an epihalohydrin and diphenylol propane having an epoxide equivalent weight of between 450 and 525, and a melting point of between 60° and 80°C.

The proportion of polyepoxide added to the block copolymer should be minor but should be sufficient to improve the color stability and/or retention of physical properties of the block copolymer during operations such as processing or utilization. Normally this will be an amount between about 0.5 and 5w% based on the block copolymer and preferably between about 1.5 and 3.5% by weight.

As stated hereinbefore, the compositions of this invention may contain other components in addition to the block copolymer and the polyepoxide resin. For example, they may contain supplementary polymers including polystyrene, high impact polystyrene (containing added or grafted elastomeric components for impact) and polyolefins such as polyethylene, polypropylene, ethylene/propylene copolymers and high impact variations of these polymers such as tail-block polypropylene. Other compatible polymers can be blended with the present compositions such as EVA or ABS polymers and polyvinyl chloride. These may be present in any desired amount, preferably between about 10 and 100 parts by weight per 100 parts of the block copolymer.

The compositions may contain plasticizers or extenders, particularly olefin oligomers, naphthenic, paraffinic, or aromatic process oils, or mineral oils, preferably mineral white oils. These should be present in amounts of about 0 to 150 parts by weight for 100 parts of block copolymer, preferably between 25 and 125 parts by weight. The compositions may contain up to 250 parts by weight of mineral fillers such as calcium carbonate and the like as well as minor amounts, between about 0.25 and 2.5% by weight, each of supplementary antioxidants, UV stabilizers or antiozonants. Preferred classes of such materials are as follows: hindered phenols, polyphenols, and phenyl phosphites; substituted thiodipropionates, hydroxy benzoates, benzophenones, and benzotriazoles; quinolines; and nickel or zinc complexes of alkyls or alkylated hindered phenols. Preferred compositions comprise the following:

poxide, while Sample B was the same composition modified with two phr (parts by weight per hundred parts of block polymer) of a polyepoxide which was prepared by reaction of epichlorohydrin with a bisphenol having an average molecular weight of 1,060 and an epoxide equivalent value between 600 and 700. The chemical structure of a typical molecule of this epoxide is as follows:

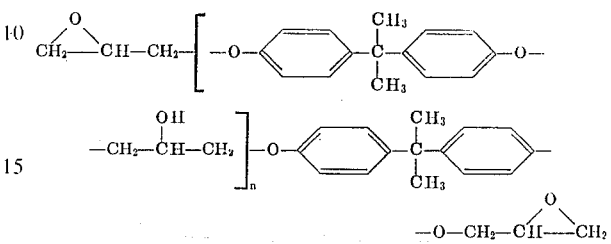

It will be seen according to the following table that Sample A (containing no polyepoxide) was badly discolored after a heat stability test, while Sample B (containing 2 phr of polyepoxide) showed no color change during the same test.

TABLE I

|  | Parts by Weight | |
| --- | --- | --- |
|  | Sample A | Sample B |
| Polystyrene-hydrogenated polybutadiene-polystyrene | 100 | 100 |
| Mineral white oil | 75 | 75 |
| Polypropylene | 25 | 25 |
| A hindered phenolphosphite | 0.2 | 0.2 |
| Dimyristyl thiodipropionate | 0.5 | 0.5 |
| A substituted hydroxybenzoate | 0.25 | 0.25 |
| A substituted benzotriazole | 0.25 | 0.25 |
| Filler (CaCO$_3$) | 198 | 198 |
| Polyepoxide | 0 | 2.0 |
| Color after 75 hours at 250°F | Badly yellowed | No change |

|  | Parts by Weight |
| --- | --- |
| Block Copolymer | 100 |
| Polyepoxide | 1–5 |
| Polypropylene | 10–75 |
| Mineral white oil | 25–125 |
| Mineral filler | 0–250 |

Samples of the same two compositions were exposed to the weather near Phoenix, Arizona. The following table shows that the sample B, which was stabilized with the polyepoxide was substantially more stable than Sample A, containing no epoxide, with respect to retention of tensile at break strength, modulus and hardness.

| Sample | Exposure[1] Months | $T_BR$,[2] % | SR,[3] % | $M_{100}R$,[4] % | Hardness[5] Change |
| --- | --- | --- | --- | --- | --- |
| Sample A | 4 | 80 | 36 | 37 | −3 |
|  | 8 | 36 | 5 | — | −9 |
| Sample B | 4 | 97 | 75 | 99 | −1 |
|  | 8 | 51 | 18 | — | −6 |

[1] Arizona 45° south exposure, direct to the weather
[2] % $T_BR$ = % retention of tensile at break = ($T_{B (exposed)}/T_{B (original)}$) × 100
[3] % SR = % strength retention = ($T_{B (exposed)}$ × $E_{B (exposed)}/T_{B (original)}$ × $E_{B (original)}$) × 100
[4] % $M_{100}R$ = % modulus retention = ($M_{100 (exposed)}/M_{100 (original)}$) × 100
[5] Change in hardness = number of points increase (+) or decrease (−) in Shore A hardness after exposure.

The following examples illustrate the reduction in discoloration and/or improvement in physical property retention which occurs by the use of the present invention.

EXAMPLE I

The following formulations were compounded and tested for color stability. Sample A contained no polye-

EXAMPLE II

Compositions were prepared comprising 100 parts by weight of a block copolymer having the structure polystyrene-polybutadiene-polystyrene (block molecular weights of 14,000-65,000-14,000) and 75 parts by weight of a Coumarone-indene resin having a Ring and Ball softening point of 155°C. This combination was modified with either zinc dibutyl dithiocarbamate and- /or the same polyepoxide used in Example I. The compositions were subjected to a bomb oxidation test under 300 psig oxygen pressure at 158°F. Table II presents the compositions, aging times and physical properties of the product so treated.

TABLE II

| phr Zinc dibutyl dithiocarbamate | phr Polyepoxide | Aging Time, Weeks | Yield Point, psi | Elongation % | Tensile Strength, psi |
| --- | --- | --- | --- | --- | --- |
| 3 | — | 0 | 1240 | 700 | 4610 |
| — | 3 | 0 | 1240 | 700 | 4680 |
| 3 | — | 6 | 1450 | 650 | 4230 |
| — | 3 | 6 | 1200 | 520 | 1780 |
| 3 | — | 14 | 300 | 0 | 300 |
| — | 3 | 14 | 0 | 0 | 0 |
| 3 | 2 | 14 | 1320 | 250 | 1170 |

The above data show that the polyepoxide is an effective stabilizer for block polymers even after six weeks exposure. After 14 weeks exposure it had lost its stabilizing capability but the thiocarbamate likewise had little stabilizing effect after this same aging period. However, the data indicate that the combination of the two components, namely, the polyepoxide and the thiocarbamate, resulted in a synergistic effect as indicated by the 14-week aging time data.

What is claimed is:

1. A block copolymer composition comprising:
   a. 100 parts by weight of a block copolymer of the group consisting of copolymers having at least one monoalkenylarene polymer block having an average molecular weight between about 5,000 and 150,000, and at least one conjugated diene polymer block having an average molecular weight between about 20,000 and 500,000 and hydrogenated derivatives thereof wherein at least 95% of the olefinic double bonds are saturated, the monoalkenyl arene being selected from the group consisting of styrene, alphamethyl styrene, ring alkylated styrenes and mixtures thereof, and the conjugated diene being selected from the group consisting of butadiene, isoprene and mixtures thereof, and
   b. 0.5–5 parts by weight of a hydroxyl-containing polyepoxide having an epoxide equivalency greater than 1.0 and an epoxide equivalent weight of between about 200 and 6,000.

2. A composition according to claim 1 containing in addition between 10 and 100 phr based on the block copolymer, of a polypropylene.

3. A composition according to claim 1 containing in addition between 10 and 100 phr based on the block copolymer, of a polystyrene.

4. A composition according to claim 1 containing in addition between 25 and 150 phr based on the block copolymer, of a hydrocarbon oil.

5. A composition according to claim 1 comprising:

| | Parts by weight |
| --- | --- |
| Block Copolymer | 100 |
| Polyepoxide | [1] 0.5–5 |
| Polypropylene | 10–[75] 100 |
| Mineral white oil | 25–125 |
| Mineral filler | 0–250 |

* * * * *